(12) United States Patent
Wang et al.

(10) Patent No.: US 9,094,781 B2
(45) Date of Patent: Jul. 28, 2015

(54) SPECTRUM REALLOCATION WITH PRIORITIZED SCHEDULE

(75) Inventors: Dong Wang, Ossining, NY (US); Hongqiang Zhai, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 36 days.

(21) Appl. No.: 14/003,104

(22) PCT Filed: Mar. 2, 2012

(86) PCT No.: PCT/IB2012/051004
§ 371 (c)(1),
(2), (4) Date: Sep. 4, 2013

(87) PCT Pub. No.: WO2012/120427
PCT Pub. Date: Sep. 13, 2012

(65) Prior Publication Data
US 2013/0337749 A1 Dec. 19, 2013

Related U.S. Application Data

(60) Provisional application No. 61/451,355, filed on Mar. 10, 2011.

(51) Int. Cl.
*H04W 72/00* (2009.01)
*H04W 4/00* (2009.01)
(Continued)

(52) U.S. Cl.
CPC ............. *H04W 4/008* (2013.01); *H04W 72/10* (2013.01); *H04W 16/14* (2013.01); *H04W 84/22* (2013.01)

(58) Field of Classification Search
CPC ..... H04W 16/04; H04W 16/06; H04W 16/10; H04W 16/14; H04W 16/16

USPC ........... 455/509, 512, 450, 451, 452.1, 452.2, 455/447, 454
See application file for complete search history.

(56) References Cited

U.S. PATENT DOCUMENTS 8,040,815 B2 * 10/2011 Silk et al. ...................... 370/252
8,363,602 B2 * 1/2013 Junell et al. ................... 370/328
(Continued)

FOREIGN PATENT DOCUMENTS

| EP | 1863303 A1 | 12/2007 |
|---|---|---|
| WO | 2009049407 A2 | 4/2009 |

OTHER PUBLICATIONS

Dhekne, R.; Machine Learning Techniques to Provide Quality of Service in Cognitive Radio Technology; 2005; Thesis for MS; Ramrao Adik Institute of Engineering, University of Mumbai, India; 111 pages.

(Continued)

*Primary Examiner* — Duc M Nguyen

(57) ABSTRACT

A medical system includes one or more medical body area network (MBAN) systems. Each MBAN system including one or more MBAN devices which acquire and communicate patient data via a hub device via a short-range wireless communication channel. The communication of the patient data via the short-range wireless communication channel within a predefined spectra. One of the spectra being a spectrum belonging to a third party primary user. The hub device receives patient data communicated from the one or more MBAN devices and communicates with a central monitoring station via a longer range communication. In response to the third party primary user requesting the third party primary user spectrum, the hub device reallocates to other spectra based on a priority of an acuity level of services communicated by each hub device.

20 Claims, 3 Drawing Sheets

(51) Int. Cl.
*H04W 72/10* (2009.01)
*H04W 16/14* (2009.01)
*H04W 84/22* (2009.01)

(56) References Cited

U.S. PATENT DOCUMENTS

| | | | |
|---|---|---|---|
| 8,385,286 B2 * | 2/2013 | Junell et al. | 370/329 |
| 8,412,247 B2 * | 4/2013 | Junell et al. | 455/509 |
| 8,451,789 B2 * | 5/2013 | Junell et al. | 370/329 |
| 2009/0180492 A1 | 7/2009 | Hu | |
| 2009/0247204 A1 * | 10/2009 | Sennett et al. | 455/512 |
| 2009/0285377 A1 * | 11/2009 | Sennett et al. | 379/201.04 |
| 2012/0182887 A1 * | 7/2012 | Junell et al. | 370/252 |
| 2012/0264396 A1 * | 10/2012 | Smith et al. | 455/404.1 |
| 2013/0310062 A1 * | 11/2013 | Liu et al. | 455/454 |

OTHER PUBLICATIONS

Smith, D., et al.; Philips Healthcare Systems Reply Comments before the Federal Communications Commission, Washington, D.C.; 2009; Amendment of the Commission's Rules to Provide Spectrum for the Operation of Medical Body Area Networks; ET Docket No. 08-59; pp. 1-50.

Thepvilojanapong, N., et al.; Resource Allocation for Coexisting ZigBee-Based Personal Area Networks; 2008; IEEE Trans on 7th International Conference on Networking; pp. 36-45.

* cited by examiner

SPECTRUM REALLOCATION WITH PRIORITIZED SCHEDULE

CROSS REFERENCE TO RELATED APPLICATIONS

This application is a national filing of PCT application Serial No. PCT/IB2012/051004, filed Mar. 2, 2012, published as WO 2012/120427 A1 on Sep. 13, 2012, which claims the benefit of US. provisional application Ser. No. 61/451,355 filed Mar. 10, 2011, which is incorporated herein by reference.

BACKGROUND

The present application relates to medical monitoring and clinical data devices for monitoring the physiological condition of a patient. It finds particular application in the use of a prioritized schedule for spectrum reallocation.

The rapid growth in physiological sensors, low power integrated circuits and wireless communication has enabled a new generation of medical body area networks (MBAN) to be used to monitor patients. MBANs provide low-cost wireless patient monitoring (PM) without the inconvenience and safety hazards posed by wired connections, which can trip medical personnel or can become detached so as to lose medical data. In the MBAN approach, multiple low cost sensors are attached at different locations on or around a patient, and these sensors take readings of patient physiological information such as patient temperature, pulse, blood glucose level, electrocardiographic (ECG) data, or so forth. The sensors are coordinated by at least one proximate hub or gateway device to form the MBAN. The hub or gateway device communicates with the sensors using embedded short-range wireless communication radios for example conforming with an IEEE 802.15.4 (Zigbee) short-range wireless communication protocol. Information collected by the sensors is transmitted to the hub or gateway device through the short-range wireless communication of the MBAN, thus eliminating the need for cables. The hub or gateway device communicates the collected patient data to a central patient monitoring (PM) station via a wired or wireless longer-range link for centralized processing, display and storage. The longer-range network may, for example, include wired Ethernet and/or a wireless network protocol such as Wi-Fi or some proprietary wireless network protocol. The PM station may, for example, include an electronic patient record database, display devices located at a nurse's station or elsewhere in the medical facility, or so forth.

MBAN monitoring acquires patient physiological parameters. Depending upon the type of parameter and the state of the patient, the acquired data may range from important (for example, in the case of monitoring of a healthy patient undergoing a fitness regimen) to life critical (for example, in the case of a critically ill patient in an intensive care unit). Because of this there is a strict reliability requirement on the MBAN wireless links due to the medical content of the data. However, the current spectrum allocations and regulations for medical wireless connectivity do not meet the strict requirements of MBAN, including medical-grade link robustness, ultra low-power consumption and low-cost, due to either limited bandwidth or uncontrolled interference.

Short-range wireless communication networks, such as MBAN systems, tend to be susceptible to interference. The spatially distributed nature and typically ad hoc formation of short-range networks can lead to substantial spatial overlap of different short range networks. The number of short-range communication channels allocated for short range communication systems is also typically restricted by government regulation, network type, or other factors. The combination of overlapping short-range networks and limited spectral space (or number of channels) can result in collisions between transmissions of different short range networks. These networks can also be susceptible to radio frequency interference from other sources, including sources that are not similar to short-range network systems.

Frequency spectrum regulation policies try to increase the spectrum use efficiency. One way to increase efficiency is to allocate an opportunistic spectrum specifically for MBAN applications and services as secondary users of a spectrum that has been previously allocated to other services on a primary basis. The basic idea of an opportunistic spectrum is to allow secondary users to opportunistically utilize the spectrum that has been previously allocated to primary users as long as such secondary users do not introduce harmful interference to the primary users. For example, it has been proposed in the U.S. to open the 2360-2400 MHz band (MBAN spectrum), currently assigned to others, to MBAN services as a secondary user. Similar proposals have been made or are expected to be made in other countries. The wide bandwidth, interference-free and good propagation properties of the MBAN spectrum would meet the strict requirements for medical-grade connectivity. In order to achieve co-existence between primary users and secondary users, some restrictions (or spectrum regulation rulings) would be put on the spectrum use of secondary users.

For example, when the allocated MBAN spectrum is used on a secondary basis, the secondary user would have to protect the primary user in that spectrum. For example, to protect the primary users, secondary users are often required to provide appropriate mechanisms to vacate the spectrum of the primary user when the primary user wants to use the spectrum. To accomplish this, enforcement mechanisms are needed. The present application proposes to integrate a mechanism in the MBAN systems to guarantee compliance with the MBAN regulations.

The simplest spectrum reallocation mechanism includes sending and receiving reallocation requests through a network connection. For example, once a MBAN coordinator receives a spectrum request from the primary user, the MBAN coordinator sends a spectrum reallocation request to backhaul access points (APs) through the hospital network connection. In response to receiving the reallocation requests from the MBAN coordinator, the backhaul AP broadcasts the request to all the MBAN hub devices that are connected to the backhaul AP via backhaul links. The MBAN hub device then disables the channels within the MBAN spectrum requested by the primary user. If the MBAN hub device is operating within the reallocated MBAN channel, the MBAN hub device initiates a dynamic channel selection to pick a new channel other than the reallocated spectrum. Once a MBAN hub device selects a new MBAN channel, it transmits a channel switch command to its corresponding MBAN devices within its MBAN network to move the MBAN network to the new channel. Once all the MBAN networks finish their channel switch operations, the MBAN spectrum requested by the primary user is vacated and ready for the primary use.

However, this solution has performance issues due to the acuity level and quality of service requirements and the potential number of MBAN networks within a healthcare facility. For example, a situation may occur where two MBAN networks exist, MBAN A operating on Channel 1 and MBAN B operating on Channel 2. MBAN A bears a high-acuity service and MBAN B bears a low-acuity service. In the example, Channels 1 and 2 are within the reallocated MBAN spectrum and Channels 3 and 4 are both idle and outside the reallocated MBAN spectrum and Channel 3 has better quality (i.e. less in-band noise-plus-interference floor) than Channel 4. If the primary user requests reallocation of the MBAN spectrum of Channels 1 and 2, the MBAN coordinator transmits spectrum reallocations requests from the backhaul AP to the MBAN hub devices of MBAN A and B (referred to as Hub A and Hub B respectively). In response to receiving the reallocation request, Hub A and Hub B performs channel scanning and dynamic channel selection operations independently (i.e. in a distributive way). A possibility exists that both Hub A and Hub B detects that Channel 3 is idle and select it. Therefore, MBAN A and MBAN B co-locate on Channel 3 and their transmissions could collide with each other even though there are two idle channels (Channel 3 and 4) available. The collisions degrade the performance of both MBAN A and MBAN B. In another case, MBAN B may initiate dynamic channel selection earlier than MBAN A and choose Channel 3 as its new channel due to the channel's better quality. If MBAN A initiates dynamic channel selection, Channel 4 is the only available channel and MBAN A will be left to operate on Channel 4, which has a worse quality compared to Channel 3, even though it has a higher acuity level than MBAN B. This may degrade the quality of service of performance of MBAN A.

The present application provides a new and improved system and method for spectrum reallocation which overcomes the above-referenced problems and others.

SUMMARY

In accordance with one aspect, a medical system is provided. The medical system includes one or more medical body area network (MBAN) systems. Each MBAN system including one or more MBAN devices which acquire and communicate patient data via a hub device via a short-range wireless communication channel. The communication of the patient data via the short-range wireless communication channel within a predefined spectra. One of the spectra being a spectrum belonging to a third party primary user. The hub device receives patient data communicated from the one or more MBAN devices and communicates with a central monitoring station via a longer range communication. In response to the third party primary user requesting the third party primary user spectrum, the hub device reallocates to other spectra based on a priority of an acuity level of services communicated by each hub device.

In accordance with another aspect, a method is provided. The method includes collecting patient data by one or more medical body area network (MBAN) devices, communicating the collected patient data from the one or more MBAN devices through the MBAN system to the hub device via a short-range wireless communication channel, the communication of the patient data via the short-range wireless communication channel being within a predefined spectra, one of the spectra being a spectrum belonging to a third party primary user, communicating the collected patient data from the hub device to a central monitoring station via longer range wireless communication; receiving a spectrum reallocation request from a MBAN coordinator requesting the third party primary user spectrum; and reallocating the MBAN system to other spectra based on a priority of an acuity level of services communicated by each hub device One advantage resides in the safe, fast, and power efficient spectrum reallocation of MBAN devices with MBAN systems.

Another advantage resides in the reduced or eliminated likelihood of loss of critical medical data acquired by an MBAN system.

Another advantage resides in improved healthcare workflow efficiency, safety, and clinical outcome.

Still further advantages of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
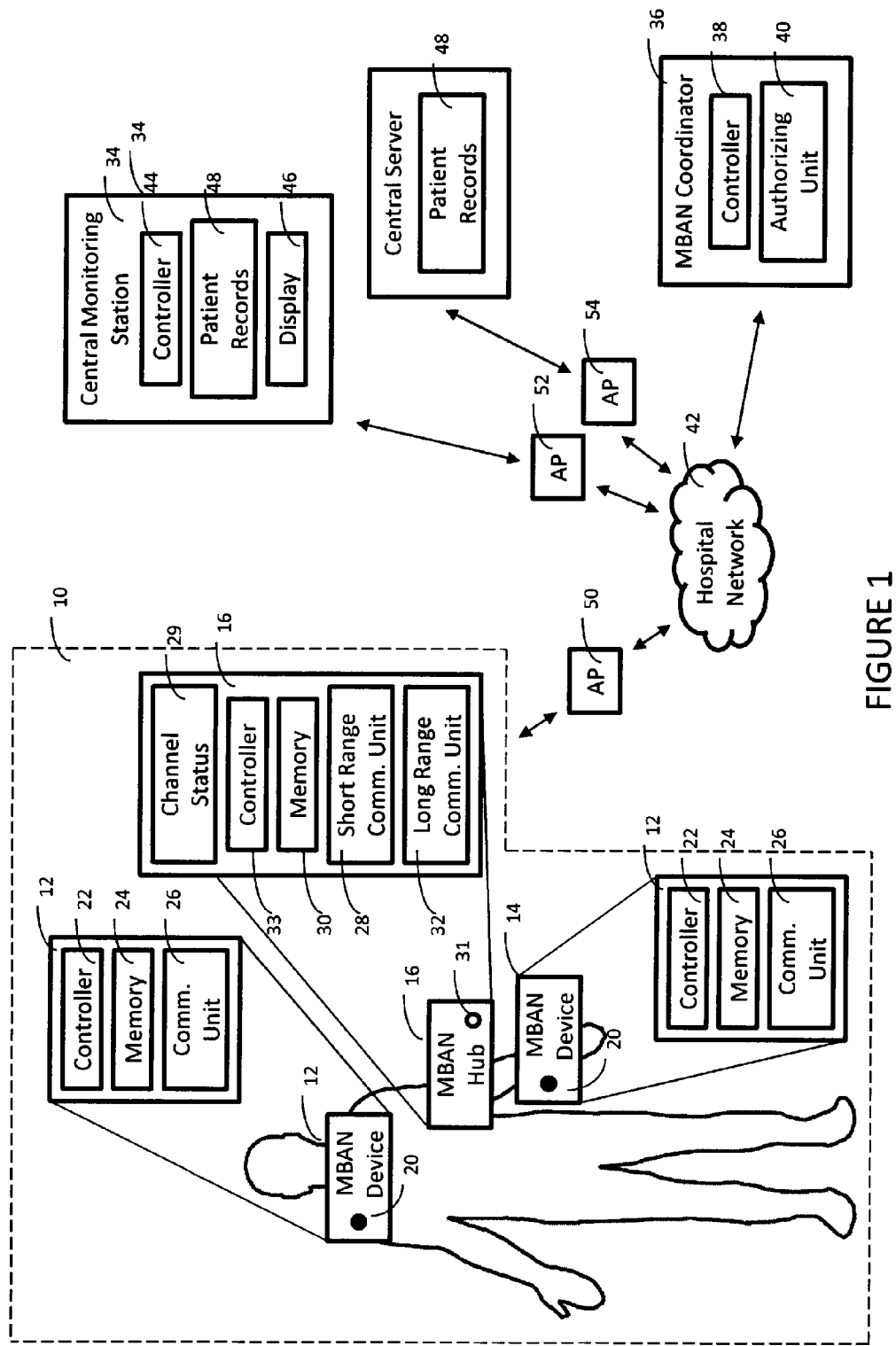
FIG. 1 diagrammatically illustrates a medical body area network (MBAN) system in accordance with the present application.

With reference to FIG. 1, each medical body area network (MBAN) 10 of a plurality of MBANs includes a plurality of MBAN devices 12, 14 and a corresponding hub device 16. The MBAN devices 12, 14 communicate with the corresponding hub device 16 via a short-range wireless communication protocol. The MBAN 10 is also sometimes referred to in the relevant literature by other equivalent terms, such as a body area network (BAN), a body sensor network (BSN), a personal area network (PAN), a mobile ad hoc network (MANET), or so forth—the term medical body area network (MBAN) 10 is to be understood as encompassing these various alternative terms.

The illustrative MBANs 10 includes two illustrative MBAN devices 12, 14 and a corresponding hub devices 16; however, the number of MBAN devices and hub devices can be one, two, three, four, five, six, or more, and moreover the number of MBAN devices may in some embodiments increase or decrease in an ad hoc fashion as MBAN devices are added or removed from the network to add or remove medical monitoring capability. The MBAN devices 12, 14 include one or more sensors 20 that acquire patient data including physiological parameters such as heart rate, respiration rate, electrocardiographic (ECG) data, or so forth; however, it is also contemplated for one or more of the MBAN devices to perform other functions such as controlled delivery of a therapeutic drug via a skin patch or intravenous connection, performing cardiac pacemaking functionality, or so forth. Other MBAN devices can be associated with a patient, and not all of the above-mentioned MBAN devices have to be associated with a patient at any given time. A single MBAN device may perform one or more functions. The illustrative MBAN devices 12, 14 are disposed on the exterior of an associated patient; however, more generally the MBAN devices may be disposed on the patient, or in the patient (for example, a MBAN device may take the form of an implanted device), or proximate to the patient within the communication range of the short-range communication protocol (for example, a MBAN device may take the form of a device mounted on an intravenous infusion pump (not shown) mounted on a pole that is kept near the patient, and in this case the monitored patient data may include information such as the intravenous fluid flow rate). It is sometimes desirable for the MBAN devices to be made as small as practicable to promote patient comfort, and to be of low complexity to enhance reliability—accordingly, such MBAN devices 12, 14 are typically low-power devices (to keep the battery or other electrical power supply small) and may have limited on-board data storage or data buffering. As a consequence, the MBAN devices 12, 14 should be in continuous or nearly continuous short-range wireless communication with the corresponding hub device 16 in order to expeditiously convey acquired patient data to the corresponding hub device 16 without overflowing its data buffer.

In FIG. 1, the short-range wireless communication range is diagrammatically indicated by the dotted line used to delineate the MBAN system 10. The short-range wireless communication is typically two-way, so that the MBAN devices 12, 14 can communicate information (e.g., patient data, MBAN device status, or so forth) to the corresponding hub device 16; and the corresponding hub device 16 can communicate information (e.g., commands, control data in the case of a therapeutic MBAN device, or so forth) to the MBAN devices 12, 14. The illustrative hub device is a waist-mounted device which facilitates carrying a longer, heavier battery and other hardware for longer range transmissions; however, the hub device can be otherwise mounted to the patient, for example as a wrist device, adhesively glued device, or so forth. It is also contemplated for the hub device to be mounted elsewhere proximate to the patent, such as being integrated with an intravenous infusion pump (not shown) mounted on a pole that is kept near the patient.

The patient data acquired from the sensors 20 is concurrently transmitted to a controller 22 in the corresponding MBAN device. The MBAN devices 12, 14 serve as a gathering point for the patient data acquired by the sensors 20 and provide temporary storage of the patient data in a memory 24. The MBAN devices 12, 14 also include a communication unit 26 for transmitting the patient data via short-range wireless communication protocol to the corresponding hub device 16. The communication unit 26 include a transceiver (not shown) to transmit the patient data and information, received by the controller 22, and receive information, from the hub device 16.

The short-range wireless communication protocol preferably has a relatively short operational range of a few tens of meters, a few meters, or less, and in some embodiments suitably employs an IEEE 802.15.4 (Zigbee) short-range wireless communication protocol or a variant thereof, or a Bluetooth™ short-range wireless communication protocol or a variant thereof. Although Bluetooth™ and Zigbee are suitable embodiments for the short-range wireless communication, other short-range communication protocols, including proprietary communication protocols, are also contemplated. The short-range communication protocol should have a sufficient range for the hub device 16 to communicate reliably with all MBAN devices 12, 14 of the MBAN system 10. The short-range wireless communication protocol between the MBAN devices 12, 14 and the corresponding hub device 16 and in some embodiments between MBAN devices operate in a frequency spectrum of around 2.3-2.5 GHz.

Due to the strict reliability requirements on MBAN system 10 communications because of the medical content of the patient data being transmitted, an opportunistic MBAN spectrum is specifically allocated for the communication of the patient data, for example, in the 2360-2400 MHz band discussed above. In the MBAN spectrum, the MBAN devices 12, 14 are secondary users of the spectrum or can use it on a secondary basis meaning the MBAN systems would have to yield to the primary users in that spectrum and vacate the spectrum. To protect the primary user, secondary users need mechanisms, such as spectrum reallocation procedures that enable secondary users to vacate the spectrum quickly when requested by primary users while continuing their services with minimum disturbance. In a first spectrum reallocation procedure, secondary users are prioritized based on the services they bear and those with high priority are scheduled to reallocate before those with a lower priority so that they have better chances to acquire channels with better quality to continue their services. In a second spectrum reallocation procedure, secondary users are sequentially scheduled to reallocate so that multiple secondary users do not to switch to the same channel which would decrease transmission collisions and degrade communication quality. These spectrum reallocation procedures allow secondary users with high priority to continue their services with no performance loss.

To accomplish this, a spectrum reallocation procedure is undertaken that enables secondary users to quickly vacate the spectrum requested by the primary users and continue their services with minimum disturbance. In the MBAN spectrum, each active MBAN network is assigned a priority based on the acuity level of its MBAN service by an MBAN coordinator 36. For example, life-critical MBAN services are assigned the highest priority level while wellbeing MBAN services without real-time monitoring may have the lowest priority level. In other words, the MBAN coordinator 36 determines the acuity level of all active MBAN networks and assigns a priority level for each of the MBAN networks according to its corresponding acuity level. The MBAN networks with higher priority levels will have precedent over MBAN networks with lower priority levels during the spectrum reallocation procedure. To receive a priority level, the MBAN devices 12, 14, the hub device 16, the hospital, or the like register the MBAN network with the MBAN coordinator 36. The MBAN coordinator 36 includes a controller 38 which receives the MBAN network registration and assigns a priority level to the MBAN network. The MBAN coordinator also includes a prioritizing unit 40 which determines the priority level of the active MBAN networks. Specifically, the prioritizing unit 40 receives information relating to the MBAN services performed by each of the active MBAN networks. The prioritizing unit 40 then determines the acuity level for all active MBAN networks and assigns a priority level for each of the MBAN networks according to their corresponding acuity level. The MBAN coordinator 36 can be a government regulatory entity, the FCC, a regional regulatory entity, the hospital in which the MBAN system is located, and the like. Assignment of the priority level could be part of administrative process conducted by a healthcare professional to start an MBAN network. Both the hub device 16 of the MBAN network and the access point (AP) that connects to that hub device 16 store the priority information of the MBAN network. Each AP or hub device 16 maintains a priority table, which includes three fields: an active MBAN network ID, which uniquely identifies each active MBAN network; a priority level, which indicates the acuity level of its MBAN service; and a current MBAN channel, which indicates the current MBAN channel used by each MBAN. The higher the acuity level, the higher the priority level.

The hub device 16 coordinates operation of its MBAN system 10 over the MBAN spectrum to receive the patient data acquired by the sensors 20 of the MBAN devices 12, 14 and transmits the collected patient data from the MBAN 10 via a longer range communication protocol to a central monitoring station 34. The patient data acquired from the sensors 20 is concurrently transmitted from the MBAN devices 12, 14 to a short range communication device 28 in the corresponding hub device 16. The hub device 16 serves as a gathering point for the patient data acquired by the sensors 20 of all the MBAN device 12, 14 in the MBAN network, e.g. all of the MBAN devices associated with one patient, and provides temporary storage of the patient data in a memory 30. The hub device 16 also includes a longer range communication unit 32 for transmitting the patient data via a longer range wireless communication protocol to the central monitoring station 34. A controller 33 of the MBAN hub 16 controls communication with the MBAN devices 12, 14, collection and handling of the patient data, retransmission of the patient data to a central monitoring station 34, receiving acknowledgements, setting up the network, associating new MBAN devices, disassociating removed MBAN devices, and the like.

The longer range communication unit 32 of the hub device 16 also includes a transceiver which provides the longer-range communication capability to communicate data from the MBAN system 10. In the illustrative example of FIG. 1, the hub device 16 wirelessly communicates with a central monitoring station 34 through an AP 50 of a hospital network 42. The illustrative AP 50 is a wireless access point that communicates wirelessly with the hub device 16. Both the hub device 16 of the MBAN network and the AP 50 that connects to that hub device 16 stores the priority table of the MBAN network. In the illustrative embodiment the hospital network 42 also includes additional access points, such as illustrative access points AP 52 and AP 54 that are distributed throughout the hospital or other medical facility. To provide further illustration, a central monitoring station is diagrammatically indicated, which is in wireless communication with the AP 52. Different APs 50-54 cover different areas of the healthcare facility and their coverage areas could overlap with each other to provide seamlessly roaming service. When a particular hub device is communicating with an AP, information about the AP and the MBAN network is communicated to the MBAN hub device 16. The information includes the active MBAN network ID, the priority level, and the current MBAN channel.

To provide further illustration, the central monitoring station 34 includes a controller 44 for receiving the patient data from many hub devices. The central monitoring station 34 also includes a display monitor 46 that may, for example, be used to display medical data for the patient that are acquired by the MBAN system 10 and communicated to the central monitoring station 34 via the AP 50 of the hospital network 42. The central monitoring station 34 also communicates with an electronic patient records sub-system 48 in which patient data and records for all current and past patients is stored. Communication between the central monitoring stations and the electronic patient records sub-system 48 is communicated via APs 42, 54 of the hospital network 42. The longer-range wireless communication is suitably a WiFi communication link conforming with an IEEE 802.11 wireless communication protocol or a variant thereof. However, other wireless communication protocols can be used for the longer-range communication, such as another type of wireless medical telemetry system (WMTS). Moreover, the longer range communication can be a wired communication such as a wired Ethernet link (in which case the hospital networks include at least one cable providing the wired longer range communication link).

The longer range communication has longer range as compared with the short-ranger communication between the MBAN devices 12, 14 and the corresponding hub device 16. For example, the short-range communication range may be of order a meter, a few meters, or at most perhaps a few tens of meters. The longer range communication can be long enough to encompass a substantial portion or all of the hospital or other medical facility whether directly or via the plurality of APs to the hospital network.

The longer-range communication, if wireless, requires more power than the short-range communication. Accordingly, the hub device 16 includes a battery or other power source sufficient to operate the longer-range communication transceiver. The hub device 16 also typically includes sufficient on-board storage so that it can buffer a substantial amount of patient data in the event that communication with the hospital network 42 is interrupted for some time interval. In the illustrative case of wireless longer-range communication, it is also to be understood that if the patient moves within the hospital or healthcare facility then the IEEE 802.11 or other wireless communication protocol employed by the hospital network 42 provides for the wireless communication. In this regard, although the patient may be confined to a bed, more generally it is contemplated that the patient may be ambulatory and moving around the hospital or healthcare facility. As the patient moves, the MBAN system 10, including the MBAN devices 12, 14 and the hub device 16, move together with the patient.

In the MBAN system 10, the MBAN devices 12, 14 communicate with the hub device 16 via the short-range wireless communication. However, it is also contemplated for various pairs or groups of the MBAN devices 12, 14 to also intercommunicate directly (that is, without using the hub devices 16, 18 as an intermediary) via the short-range wireless communication. This may be useful, for example, to coordinate the activities of two or more MBAN devices in time. Moreover, the hub devices 16, 18 may provide additional functionality. For example, the hub devices 16, 18 may also be a MBAN device that includes one or more sensors for measuring physiological parameters. Still further, while the single hub devices 16, 18 is illustrated, it is contemplated that an MBAN system can have two or more hubs that cooperatively perform the task of coordinating functionality (e.g. data collection from the MBAN devices 12, 14 and offloading the collected data via the longer range wireless communication).

In illustrative FIG. 1, only one MBAN system 10 is illustrated in detail. However, it will be appreciated that more generally the hospital or other medical facility includes a plurality of patients, each having his or her own MBAN system. More generally, the number of MBAN systems may be, by way of some illustrative examples: the hundreds, thousands, tens of thousands, or more depending on the size of the medical facility. Indeed, it is even contemplated for a single patient to have two or more different, independently or cooperatively operating MBAN systems (not illustrated). In this environment, various MBAN systems of different patients can be expected to come into close proximity with one another, such that the ranges of the respective MBAN system short-range wireless communications overlap.

The MBAN devices 12, 14, the MBAN hub 16, the MBAN system 10, the MBAN coordinator, and the central monitoring station 34 in the illustrative embodiment include at least one processor, for example a microprocessor or other software controlled device configured to execute MBAN software for performing the operations described in further detail below. Typically, the MBAN software is carried on tangible memory or a computer readable medium for execution by the processor. Types of non-transitory computer readable media include memory such as a hard disk drive, CD-ROM, DVD-ROM, internet servers, and the like. Other implementations of the processor are also contemplated. Display controllers, Application Specific Integrated Circuits (ASICs), FPGAs, and microcontrollers are illustrative examples of other types of component which may be implemented to provide functions of the processor. Embodiments may be implemented using software for execution by a processor, hardware, or some combination thereof.

As mentioned above, the MBAN spectrum is an opportunistic spectrum that allows secondary users to opportunistically utilize the spectrum that has been previously allocated to primary users if such secondary uses do not introduce harmful interference to primary users. Each active MBAN network is assigned a priority based on the acuity level of its MBAN service. Each backhaul AP maintains a priority table, as shown below, which includes the active MBAN network ID, the priority level, and the current MBAN channel.

| Active MBAN network ID | Priority Level | Current MBAN Channel |
|---|---|---|
| MBAN A | 5 | 1 |
| MBAN B | 1 | 2 |

Once a backhaul AP 50-52 receives a spectrum reallocation request from a primary user through the MBAN coordinator 36, it broadcasts a spectrum reallocation request command to the hub devices 16 that are connected to it through its backhaul links. Such command includes the following parameters: the frequency range of the requested spectrum or a list of the MBAN channels that are located within the requested spectrum that should be vacated, the spectrum reallocation deadline before which an MBAN hub should change spectrum channels to a new channel outside the requested spectrum if its currently used channel is within the requested spectrum, and a contention window table which has the following format.

| Priority level (L) | Contention Window Start time (TS(L)) | Contention Window Length (TL(L)) |
|---|---|---|

Figure 2:
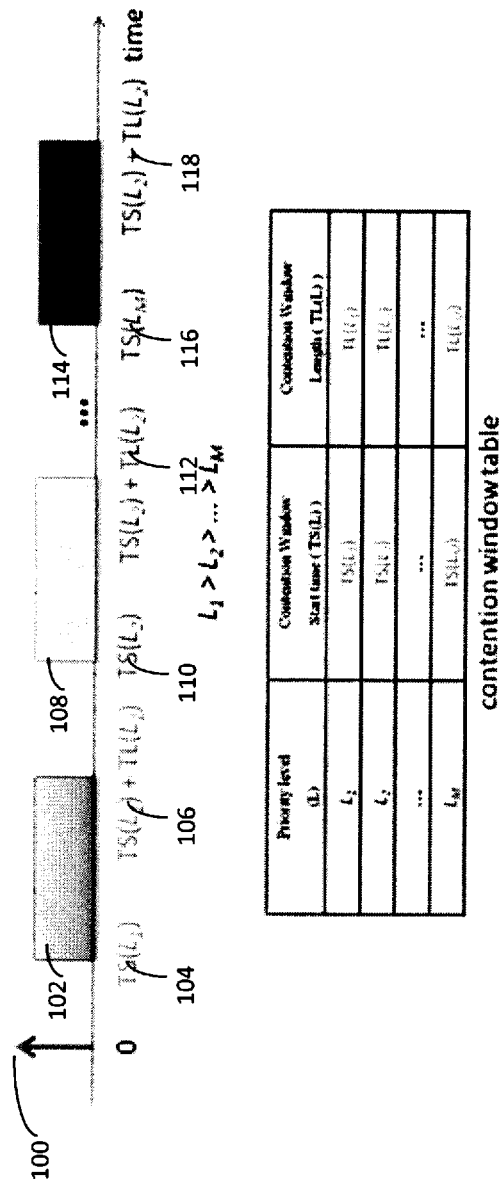
FIG. 2 diagrammatically illustrates a prioritized contention window procedure in accordance with the present application.

As shown in FIG. 2, a prioritized contention window procedure begins at a time 100 at which an MBAN hub receives a spectrum reallocation request from the primary user. Upon reception of the spectrum reallocation request, a $L_1$ contention window 102 is opened for MBANs with the highest priority level. The $L_1$ contention window starts at a time $TS(L_1)$ 104 and remains open for a $L_1$ window contention length $TS(L_1)+TL(L_1)$ 106. At the end of the $L_1$ window contention length, a second $L_2$ contention window 108 is opened for MBANs with the next highest priority level. The second $L_2$ contention window starts at a time $TS(L_2)$ 110 and remains open for a $L_2$ window contention length $TS(L_2)+TL(L_2)$ 112. At the end of the second $L_2$ window contention length, a third $L_3$ contention window 114 is opened for MBANs with the third highest priority level. The third $L_3$ contention window starts at a time $TS(L_3)$ 116 and remains open for an $L_3$ window contention length $TS(L_3)+TL(L_3)$ 118. At the end of the $L_3$ window contention length, contention windows are opened progressively for any remaining priority levels.

If there are one or more MBANs with a priority level of $L_i$ that are currently operating within the requested spectrum, a record is stored in the contention window table for the priority level $L_i$. The contention window table is an ordered table in the sense that for two records in the table with priority level of $L_1$ and $L_2$, respectively, $TS(L_2)>TS(L_1)+TL(L_1)$ if $L_1>L_2$. In other words, if the priority level of $L_1$ is greater than the priority level of $L_2$ then the contention window $L_1$ will end before the start of the contention window $L_2$. The contention window length of a priority level $L_i$ can be optimized by the AP to minimize the collision probability (i.e. the probability that multiple MBANs with the same priority level $L_i$ select and switch to a same channel) while maintaining a reasonable response time. For example, if an AP knows there is only one MBAN with a priority level $L_i$ that currently operates within the requested spectrum, it sets the contention window length of level $L_i$ to 0. If an AP knows there are many MBANs with priority level $L_i$ and a channel switching operation is scheduled to occur, the AP uses a large contention window length for level $L_i$ to reduce the potential contention probability. The start time $TS(L_i)$ can be selected to provide enough time for MBANs with priority levels higher than $L_{i-1}$ to finish their channel switching operations.

Each hub device 16 maintains an MBAN channel status table 29 to indicate whether an MBAN channel is disabled or not. Once receiving a spectrum reallocation request, the hub device 16 updates its channel status table to disable the MBAN channels within the reallocated spectrum. Through the channel status table update operation, the MBAN channels within the reallocated spectrum are excluded from consideration in future dynamic channel selection operations and the future use of those channels are disabled. If one of the MBAN networks 10 is currently using an MBAN channel within the reallocated spectrum the MBAN network may continue its MBAN communications on its current channel for a predetermined time period. The hub devices also concurrently check to determine if its current channel is in the reallocated spectrum upon reception of a spectrum reallocation request. If the hub device is not operating on a reallocated channel, it sends an acknowledgment (ACK) to its backhaul AP to confirm the completion of its spectrum reallocation operation. If the hub device is operating in the reallocated channel, it starts a timer 31 with the predetermined expiration time set as the spectrum reallocation deadline parameter received within the command. Once this timer has timed out, the hub device automatically initiates a dynamic channel selection operation to select a new channel from the list of enabled MBAN channel and switches to the new channel to continue MBAN operations. Each hub device that currently operate within the reallocated spectrum determine its proper contention window from the contention window table [TS $(L_\alpha)$, $TS(L_\alpha)+TL(L_\alpha)$], where $L_\alpha$ is the priority level of the hub device. The hub device randomly picks up a time t within its contention window, $TS(L_\alpha)<=t<=TS(L_\alpha)+TL(L_\alpha)$ and initiates a dynamic channel selection operation to select a new channel from the list of enabled channels (which is outside the reallocated spectrum) and performs channel switching operation at time t. Once a hub device finishes its channel switching operation, it sends a spectrum reallocation confirmation with its new MBAN channel information to its AP and disables its spectrum reallocation timer. Using an ordered contention window table, the MBAN networks with the high priority have a higher probability of obtaining a higher quality new channel compared to low priority MBAN networks because the higher priority MBAN networks start dynamic channel selection and channel switch operation earlier.

For example, the AP broadcasts a spectrum reallocation command with a contention window table, which has two records for a higher priority level 5 and a lower priority level 1, respectively and $TS(1)>TS(5)+TL(5)$. For priority level 5, only MBAN A operates in the reallocated spectrum and performs a channel switch and the AP sets a reallocated start timer $TL(5)$ to 0 to reduce the response time. Once MBAN A receives the spectrum reallocation command, MBAN A looks up the time TS(5) in the contention window table. MBAN then starts the dynamic channel selection operation at the time TS(5) and selects Channel 3 as its new channel because it has a better quality. The MBAN A then switches to Channel 3 to continue its operation. After finishing its channel switch operation, the MBAN A sends a confirmation to its AP. When MBAN B receives the command, it looks up TS(1) as its spectrum reallocation time in the contention window table. At TS(1), the MBAN B starts its dynamic channel selection operation. Since Channel 3 is occupied by MBAN A (since TS(1)>TS(5)) at TS(1), the MBAN B selects Channel 4 and performs channel switching to move to Channel 4 to continue its operations.

In another embodiment, once an AP receives a spectrum reallocation request through the MBAN coordinator 36, the AP broadcasts a spectrum reallocation notification to the hub devices that are connected to it through backhaul links, which may be either wired or wireless. The purpose of the notification is to inform all the MBAN networks to avoid switching to a new channel that is located within the reallocated spectrum. The notification includes a frequency range of the reallocated spectrum or a list of the MBAN channels that are located within the reallocated spectrum that should be disabled and a spectrum reallocation deadline by which each MBAN hub should have moved its network to a new channel outside the reallocated spectrum if its currently used channel is within the reallocated spectrum, and the like. Each hub device maintains an MBAN channel status table 29 to indicate whether an MBAN channel is disabled or not. Once the MBAN hub device receives a spectrum reallocation notification, the MBAN hub device updates its channel status table to disable the MBAN channels within the requested spectrum. Through the channel status table update operation, the MBAN channels within the reallocated spectrum are excluded from consideration in future dynamic channel selection operations and the future use of those channels is disabled. It is worth pointing out that an MBAN network that is currently using an MBAN channel within the reallocated spectrum continues its MBAN communications on its current channel and no channel switching is triggered by the mere notification. The hub device checks if its current channel is in the reallocated spectrum. If the hub device is operating in the reallocated spectrum, it starts a timer 31 with the spectrum reallocation deadline parameter received within the notification set as the timer expiration time.

Once this timer 31 is expired and if the hub device has not already switched from the relocated spectrum, the hub device automatically initiates a dynamic channel selection operation to select a new channel from the list of currently enabled MBAN channels and switches to the selected new channel to continue MBAN operations. The hub device then sends an acknowledgment (ACK) to its AP to confirm the reception of and compliance with the notification. The AP tries to receive ACKs from all its hub devices for a predefined period. If the AP receives all the ACKs from the hub devices connected to it, a spectrum reallocation command is transmitted to the next lower priority hub(s). If there are ACKs missing, the AP retransmits the notification to those hub devices who's ACKs are missing and the AP retransmits $N_i$ (predefined value) times. If ACKs remain missing, the AP generates warning messages to request staff intervention.

The AP transmits spectrum reallocation commands to its hub devices to vacate the reallocated spectrum based on the MBAN priority level. The spectrum reallocation command includes the MBAN priority level. The AP first broadcasts a spectrum reallocation command including a priority level parameter to the highest priority level (P). If a hub device is currently operating on a channel outside the reallocated spectrum, it removes the reallocated spectrum from its enabled channels list and sends a confirmation. If this hub device is currently operating on a channel within the reallocated spectrum, it compares the priority level parameter with its own priority level. If the hub device has a priority level higher or equal to the priority level parameter, the hub device initiates the dynamic channel selection operation to select a new channel from the list of enabled channels (outside the allocated spectrum) and performs the channel switching operation. Once the MBAN hub device finishes its channel switching operation, it sends the spectrum reallocation confirmation with its new MBAN channel information to its AP. Once the AP receives all the expected confirmations from the hub devices (those have a priority level of P), it broadcasts a spectrum reallocation command with the priority parameter set to the next highest priority level, unless there are no MBANs with such priority level operating in the reallocated spectrum. This procedure continues with the descending order of the priority levels. For example, the backhaul AP first broadcasts a spectrum reallocation command with the priority level parameter of 5. Since the MBAN B (with a priority level of 1) has a lower priority level (1<5), it ignores the command once receiving it. Once the available MBAN A (with a priority level of 5) receives such command, it starts the dynamic channel selection operation and selects Channel 3 as its new channel because it has a better quality. The MBAN A then switches to Channel 3 to continue its operation. After receiving the confirmation from MBAN A, the AP broadcasts a series of spectrum reallocation command for levels 4, 3, 2, and finally for the priority level 1. Once the MBAN B receives this command (with priority level parameter of 1), it determines its own priority level is equal to the priority level parameter and then starts the dynamic channel selection operation. Since Channel 3 has already been used by MBAN A, it selects the next best channel, Channel 4 in this example, and performs channel switching to move to Channel 4 to continue its operation.

This option can also be integrated with the contention window mechanism. Specifically, a contention window length parameter can be included in the spectrum reallocation command. If an MBAN hub device has a priority level that matches the priority level of the spectrum reallocation command, the MBAN randomly picks up a time t within the contention window defined by that spectrum reallocation command and initiates its dynamic channel selection and channel switch operation at time t.

Figure 3:
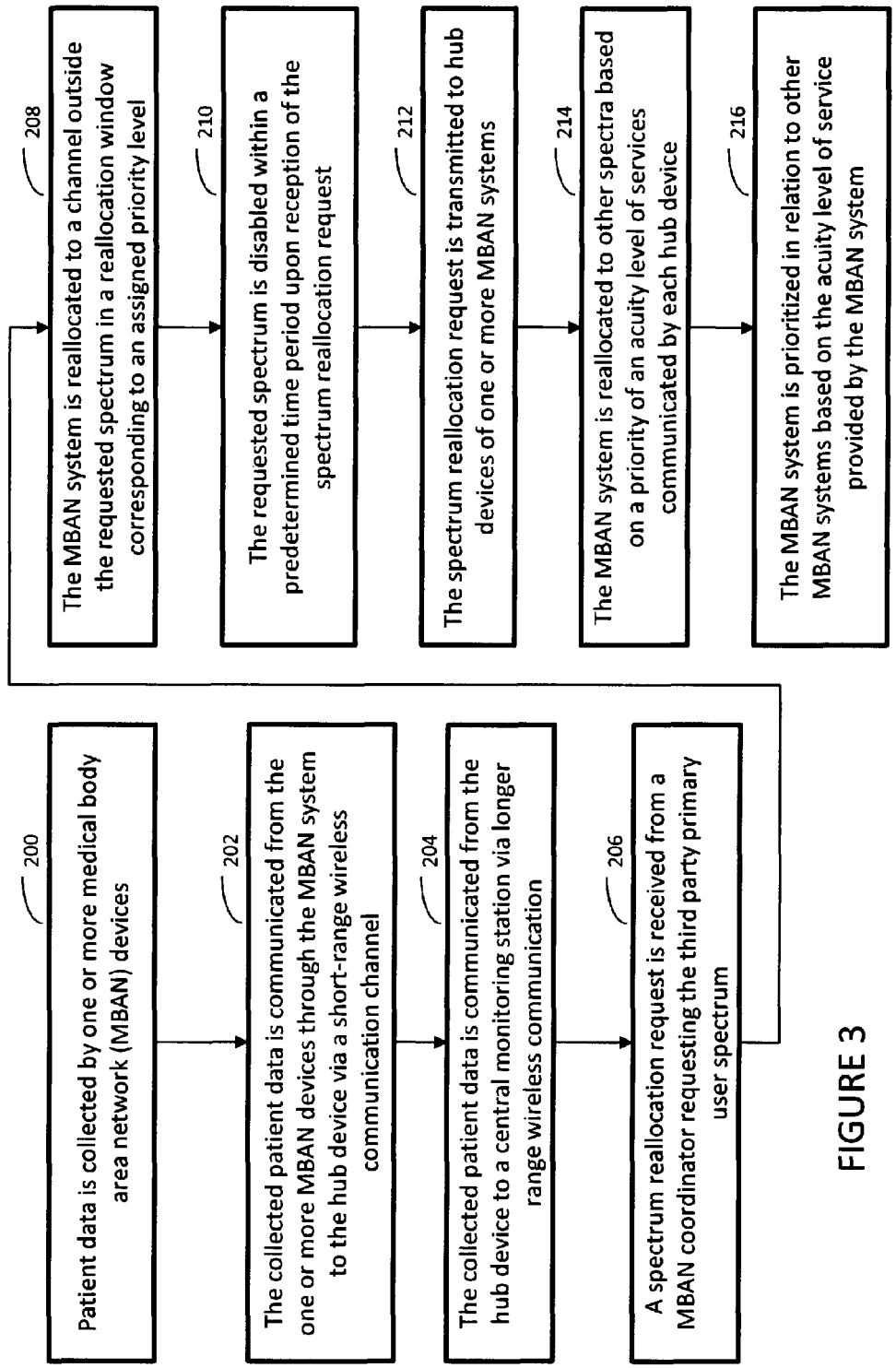
FIG. 3 is a flowchart diagram of the operation of the MBAN system in accordance with the present application.

FIG. 3 illustrates operation of the MBAN system. In a step 200, patient data is collected by one or more medical body area network (MBAN) devices. In a step 202, the collected patient data is communicated from the one or more MBAN devices through the MBAN system to the hub device via a short-range wireless communication channel. The communication of the patient data via the short-range wireless communication channel being within a predefined spectra where one of the spectra is a spectrum belonging to a third party primary user. In a step 204, the collected patient data is communicated from the hub device to a central monitoring station via longer range wireless communication. In a step 206, a spectrum reallocation request is received from a MBAN coordinator requesting the third party primary user spectrum. In a step 208, the MBAN system is reallocated to a channel outside the requested spectrum in a reallocation window corresponding to an assigned priority level. In a step 210, the requested spectrum is disabled within a predetermined time period upon reception of the spectrum reallocation request. In a step 212, the spectrum reallocation request is transmitted to hub devices of one or more MBAN systems. In a step 214, the MBAN system is reallocated to other spectra based on a priority of an acuity level of services communicated by each hub device. In a step 216, the MBAN system is prioritized in relation to other MBAN systems based on the acuity level of service provided by the MBAN system.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A medical system comprising:
    one or more medical body area network (MBAN) systems, each MBAN system including:
        one or more MBAN devices which acquire and communicate patient data via a hub device via a short-range wireless communication channel, the communication of the patient data via the short-range wireless communication channel being within a predefined spectra, one of the spectra being a spectrum belonging to a third party primary user;
        the hub device which receives patient data communicated from the one or more MBAN devices and communicates with a central monitoring station via a longer range communication;
        wherein in response to the third party primary user requesting the third party primary user spectrum, each hub device communicating via one of the spectra belonging to the third party is reallocated to another spectra based on a priority level of an acuity level of services communicated by each hub device.

2. The medical system according to claim 1, further including:
    an MBAN coordinator which assigns the priority level to the one or more MBAN systems based on the acuity level of services provided by each of the one or more MBAN systems.

3. The medical system according to claim 2, wherein MBAN systems providing life critical services have a higher priority level than MBAN systems providing wellbeing services.

4. The medical system according to claim 2, wherein the MBAN coordinator receives requests for the third party user spectrum from the third party primary user and transmits a spectrum reallocation request to the hub devices of the one or more MBAN systems.

5. The medical system according to claim 4, wherein in response to receiving the spectrum reallocation request from the MBAN coordinator, the hub device reallocates the MBAN system to a channel outside the requested third party primary user spectrum.

6. The medical system according to claim 2, wherein the one or more MBAN systems are assigned a priority level and reallocated to a channel outside the requested third party primary user spectrum in a reallocation time window corresponding to the assigned priority level.

7. The medical system according to claim 2, wherein the MBAN coordinator broadcasts a spectrum reallocation notification in response to receiving the spectrum reallocation request.

8. The medical system according to claim 1, wherein each hub device includes a channel status table which indicates active and/or disabled channels.

9. The medical system according to claim 1, wherein in response to receiving the spectrum reallocation notification, the hub devices exclude the requested spectrum from future reallocation operations.

10. A medical system comprising:
    one or more medical body area network (MBAN) systems, each MBAN system including:
        one or more MBAN devices which acquire and communicate patient data via a hub device via a short-range wireless communication channel, the communication of the patient data via the short-range wireless communication channel being within a predefined spectra, one of the spectra being a spectrum belonging to a third party primary user;
        the hub device which receives patient data communicated from the one or more MBAN devices and communicates with a central monitoring station via a longer range communication;
    wherein in response to the third party primary user requesting the third party primary user spectrum, the hub device is reallocated to other spectra based on a priority of an acuity level of services communicated by each hub device;
    wherein the hub device includes a timer which disables the requested spectrum within a predetermined time period upon reception of the spectrum reallocation request.

11. A method comprising:
    collecting patient data by one or more medical body area network (MBAN) devices;
    communicating the collected patient data from the one or more MBAN devices through the MBAN system to the hub device via a short-range wireless communication channel, the communication of the patient data via the short-range wireless communication channel being within a predefined spectra, one of the spectra being a spectrum belonging to a third party primary user;
    communicating the collected patient data from the hub device to a central monitoring station via longer range wireless communication;
    receiving a spectrum reallocation request from a MBAN coordinator requesting the third party primary user spectrum; and
    reallocating the MBAN system to other spectra based on a priority of an acuity level of services communicated by each hub device.

12. The method according to claim 11, further including:
    prioritizing the MBAN system in relation to other MBAN systems based on the acuity level of service provided by the MBAN system.

13. The method according to claim 11, wherein life critical services are assigned a higher priority than wellbeing services.

14. The method according to claim 11, further including:
    disabling the requested spectrum within a predetermined time period upon reception of the spectrum reallocation request.

15. The method according to claim 11, further including:
    transmitting the spectrum reallocation request to hub devices of one or more MBAN systems.

16. The method according to claim 11, further including:
    relocating the hub devices to a channel outside a requested spectrum in response to receiving a spectrum reallocation request from the MBAN coordinator.

17. The method according to claim 11, further including:
    updating a channel status table indicating active and/or disabled channels.

18. A medical system comprising:
one or more processor programmed to perform the method according to claim 11.

19. A non-transitory computer readable medium containing software which when loaded into processor programs the processor to perform the method according to claim 11.

20. A method including:
collecting patient data by one or more medical body area network (MBAN) devices;
communicating the collected patient data from the one or more MBAN devices through the MBAN system to the hub device via a short-range wireless communication channel, the communication of the patient data via the short-range wireless communication channel being within a predefined spectra, one of the spectra being a spectrum belonging to a third party primary user;
communicating the collected patient data from the hub device to a central monitoring station via longer range wireless communication;
receiving a spectrum reallocation request from a MBAN coordinator requesting the third party primary user spectrum; and
reallocating the MBAN system to a channel outside the requested spectrum in a reallocation window corresponding to an assigned priority level based on an acuity level of services communicated by each hub device.

* * * * *